US009977599B2

(12) United States Patent
Delgado et al.

(10) Patent No.: US 9,977,599 B2
(45) Date of Patent: May 22, 2018

(54) DATA DEDUPLICATION WITH SUPPORT FOR BOTH THICK AND THIN PROVISIONING OF STORAGE OBJECTS

(71) Applicant: VMware, Inc., Palo Alto, CA (US)

(72) Inventors: Jorge Guerra Delgado, Sunnyvale, CA (US); Kiran Joshi, San Jose, CA (US); Edward J Goggin, Concord, MA (US); Srinath Premachandran, Fremont, CA (US); Sandeep Rangaswamy, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 325 days.

(21) Appl. No.: 14/993,827

(22) Filed: Jan. 12, 2016

(65) Prior Publication Data
US 2017/0199674 A1    Jul. 13, 2017

(51) Int. Cl.
*G06F 3/06*    (2006.01)

(52) U.S. Cl.
CPC .......... *G06F 3/0608* (2013.01); *G06F 3/0641* (2013.01); *G06F 3/0665* (2013.01); *G06F 3/0683* (2013.01)

(58) Field of Classification Search
CPC .... G06F 3/0608; G06F 3/0641; G06F 3/0665; G06F 3/0683
See application file for complete search history.

(56) References Cited

U.S. PATENT DOCUMENTS

| 9,268,491 | B2 * | 2/2016 | Goodman | G06F 3/0655 |
| 2010/0312976 | A1 * | 12/2010 | Kaneda | G06F 3/0605 711/162 |
| 2014/0344229 | A1 * | 11/2014 | Lillibridge | G06F 3/0608 707/692 |

* cited by examiner

*Primary Examiner* — Charles Rones
*Assistant Examiner* — Hewy H Li

(57) ABSTRACT

Techniques for implementing data deduplication in conjunction with thick and thin provisioning of storage objects are provided. In one embodiment, a system can receive a write request directed to a storage object stored by the system and can determine whether the storage object is a thin or thick object. If the storage object is a thin object, the system can calculate a usage value by adding a total amount of physical storage space used in the system to a total amount of storage space reserved for thick storage objects in the system and further subtracting a total amount of reserved storage space for the thick storage objects that are filled with unique data. The system can then reject the write request if the usage value is not less than the total storage capacity of the system.

21 Claims, 7 Drawing Sheets

```
FOR EACH WRITE REQUEST(D) {
    H = GETHASH(D);
    IF (E=HASHMAP.LOOKUP(H)) {
        E.REFCOUNT++;
    } ELSE {
        ALLOCATE PHYSICAL SPACE;
        HASHMAP.INSERT(H);
    }
}
```

*FIG. 2*

```
FOR EACH WRITE REQUEST(D) {
    H = GETHASH(D);
    IF (E=HASHMAP.LOOKUP(H)) {
        E.REFCOUNT++;
     ┌  PHYSICALUSED--;
602┤  IF (OBJECT IS THICK) {
     │      THICKRESERVEDUSED--;
     └  }
    } ELSE {
        ALLOCATE PHYSICAL SPACE;
        HASHMAP.INSERT(H);
    }
}
```

*FIG. 6*

DATA DEDUPLICATION WITH SUPPORT FOR BOTH THICK AND THIN PROVISIONING OF STORAGE OBJECTS

BACKGROUND

Data deduplication is a technique for reducing storage consumption in a storage system by eliminating redundant data. For example, if the storage system contains three storage objects O1, O2, and O3 that each include an identical unit of data D, data deduplication enables only one instance of D to be retained on the physical storage device(s) of the system. In this example, each storage object O1, O2, and O3 is configured to point to the single instance of D (rather than including a redundant copy of the data), thereby reducing the storage footprint of the objects.

While data duplication has clear benefits in terms of optimizing storage space usage, it is generally difficult to implement this feature in conjunction with both thick and thin provisioning of storage objects. This difficulty arises out of the fact that, for a thickly-provisioned (i.e., thick) storage object, a storage system must ensure that write requests to any portion of the object can be completed successfully. However, with existing data deduplication techniques, this property is not guaranteed. For instance, in a storage system that implements conventional data deduplication, any write request directed to a previously redundant portion of a storage object can result in the creation of new, unique data that requires the allocation of additional physical storage space (since the storage object can no longer point to a deduplicated copy of that data). If the storage system is already at capacity the write request will fail, which is not an acceptable behavior if the storage object is thickly-provisioned.

SUMMARY

Techniques for implementing data deduplication in conjunction with thick and thin provisioning of storage objects are provided. In one embodiment, a system can receive a write request directed to a storage object stored by the system and can determine whether the storage object is a thin or thick object. If the storage object is a thin object, the system can calculate a usage value by adding a total amount of physical storage space used in the system to a total amount of storage space reserved for thick storage objects in the system and further subtracting a total amount of reserved storage space for the thick storage objects that are filled with unique data. The system can then reject the write request if the usage value is not less than the total storage capacity of the system.

The following detailed description and accompanying drawings provide a better understanding of the nature and advantages of particular embodiments.

BRIEF DESCRIPTION OF THE DRAWINGS

FIG. 2 depicts a pseudo code listing of a data deduplication process according to an embodiment.

FIG. 6 depicts a modified version of the pseudo code listing of FIG. 2 according to an embodiment.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques that allow a storage system to implement data deduplication and simultaneously support both thick and thin provisioning of storage objects. As used herein, a thinly-provisioned (i.e., thin) storage object is a storage object that is created without being pre-allocated any space (or only a minimum amount of space) on physical storage; storage space is allocated to the object on-demand as data is written to it. Thus, it is understood that a write request directed to a thin storage object may not complete successfully if, e.g., sufficient storage space is not available at the time of the request. On the other hand, a thickly-provisioned (i.e., thick) storage object is a storage object that is pre-allocated its full, reserved size on physical storage at the time of its creation. This dictates that write requests to any portion of a thick storage object must be guaranteed to complete successfully (since there should always be allocated space for storing the write data).

As described in further detail below, the ability to use data deduplication with both thick provisioning and thin provisioning is achieved via an "admission control" feature that validates write requests directed to thin storage objects, prior to allowing the write requests to be processed for data deduplication purposes. This admission control feature can ensure that write requests to thick storage objects will not fail due to a lack of physical storage space in the storage system.

Figure 1:
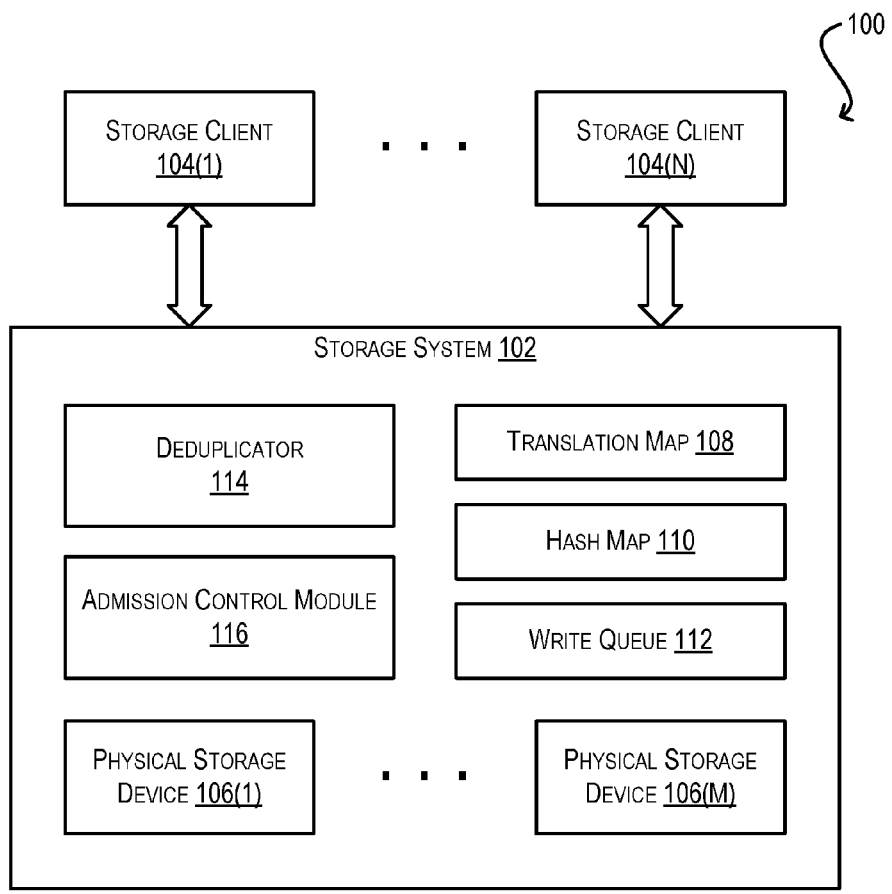
FIG. 1 depicts a system environment according to an embodiment.

FIG. 1 depicts a system environment 100 in which embodiments of the present disclosure may be implemented. As shown, system environment 100 includes a storage system 102 that is connected to a number of storage clients 104(1)-(N). Storage system 102 can be a general purpose computer system or a dedicated computer system/storage array that includes one or more physical, nonvolatile storage devices 106(1)-(M) (e.g., hard drives, solid state disks (SSDs), etc.), Physical storage devices 106(1)-(M) can be integral to storage system 102 as shown in FIG. 1 and/or communicatively coupled to storage system 102 via one or more networks (e.g., a storage area network (SAN), an Ethernet network, etc.). Storage clients 104(1)-(N) can be physical machines, virtual machines (VMs), or applications that are configured to read data from and write data to storage objects (e.g., files, disks, volumes, etc.) that are retained on physical storage devices 106(1)-(M) of storage system 102.

In the example of FIG. 1, storage system 102 implements data deduplication of data that is written by storage clients 104(1)-(N). To that end, storage system 102(1) maintains a translation map 108 and a hash map 110. In various embodiments, translation map 108 can include, for each unit of data written by storage clients 104(1)-(N), a mapping between (1) a logical offset for the data unit in a logical storage address space of storage system 102 and (2) a physical offset in a particular storage device 106 wherein the data unit is actually stored. Hash map 110 can include, for each unique unit of data stored on physical storage devices 106(1)-(M), an entry that identifies (1) the physical offset of the data unit, (2) a hash of the data content, and (3) and a reference count of the number of logical data units that point to this physical data unit.

To carry out conventional data deduplication, when storage system 102 receives a write request directed to a particular data unit D from a storage client 104, storage system 102 can add the write request to a write queue 112. Then, on a periodic basis, a deduplicator component 114 of storage system 102 can process the write requests in write queue 112 and, for each request, calculate the hash of D (e.g., H) and check whether H exists in hash map 110. If so, deduplicator 114 can conclude that there is no need to write D to physical storage devices 106(1)-(M) (since a deduplicated copy of D already exists per the hash map); instead, deduplicator 114 can simply increase the reference count of the hash map entry and add a new mapping in translation map 108 that causes the logical offset of D to point to the physical offset of the existing deduplicated copy.

On the other hand, if H cannot be found in hash map 110, deduplicator 114 can conclude that a copy of D has not yet been stored on physical storage devices 106(1)-(M). As a result, deduplicator 114 can allocate new physical storage space (i.e., a new physical offset) for D, insert a new entry into hash map 110 that identifies the newly allocated physical offset, hash value H, and a reference count of 1, and finally insert a new mapping into translation map 108 that maps the logical offset for D to the new physical offset. Pseudo code for this deduplication process is shown in FIG. 2 as listing 200.

Figure 3:
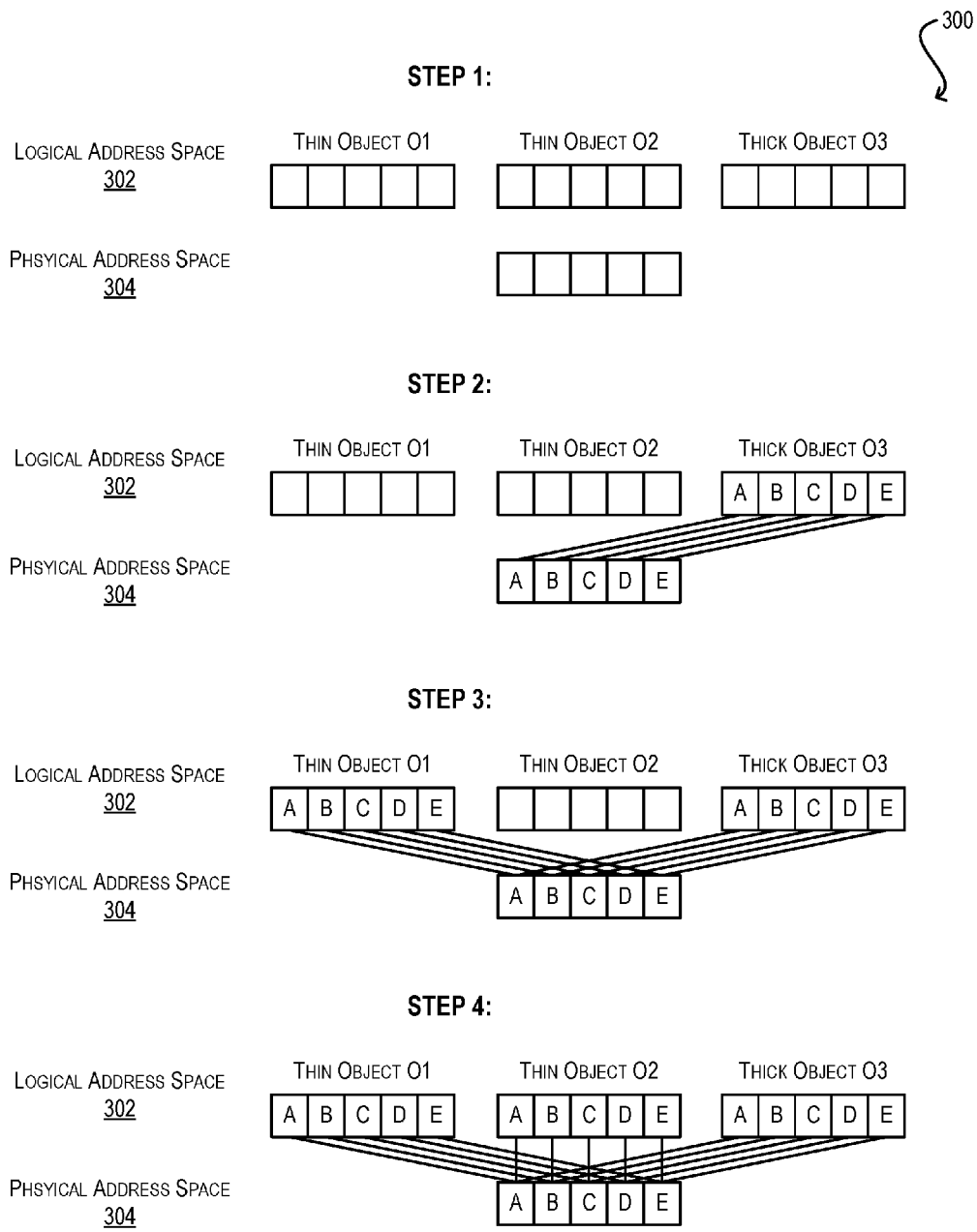
FIG. 3 depicts an example data storage scenario according to an embodiment.

As noted in the Background Section, one difficulty with implementing data deduplication is that it can cause problems when used concurrently with both thick and thin provisioning of storage objects. To illustrate this, consider scenario 300 depicted in FIG. 3. In this scenario, it is assumed that there is a total of 5 data units of physical storage capacity (shown by physical address space 304).

At step (1) of scenario 300, 3 storage objects O1, O2, and O3 are provisioned with a reserved size 5 in a logical address space 302. As shown, objects O1 and O2 are thinly-provisioned and thus are thin storage objects, while object O3 is thickly-provisioned and thus is a thick storage object. This means that 5 units of physical storage may be available for writing data to objects O1 and O2 respectively but are not guaranteed, while 5 units of physical storage should be available at all times for writing data to object O3.

At step (2), 5 unique data units are written to object O3 (represented by identifiers A, B, C, D, and E). This causes the 5 data units to be written to physical address space 304 and pointers to the physically written data to be associated with object O3 (via, e.g., the translation map described earlier).

Then, at steps (3) and (4), the same 5 data units A, B, C, D, and E are written to objects O1 and O2. Since a copy of these data units have already been written to physical storage at step (1), each object O1 and O2 is updated to include pointers to the existing data. At the conclusion of this process, all 5 physical storage units are in use with 3 pointers to each unit (one from each of objects O1, O2, and O3).

The problem with scenario 300 is that, if the storage system subsequently tries to overwrite any portion of object O3 with different data (e.g., a data unit Z), the write will fail because there is no available physical storage space in the system. This behavior is not acceptable because object O3 is a thick, rather than thin, storage object.

To address this and other similar problems, storage system 100 of FIG. 1 is modified to implement a novel admission control module 116. At a high level, when a write request to a thin storage object is received by storage system 102 from a storage client 104, admission control module 116 can determine (1) the overall physical storage space usage of the system, (2) the amount of storage space reserved for thick storage objects, and (3) the amount of reserved storage space for thick storage objects that contain "unique" data (i.e., data that is only referred to by a single thick storage object). Admission control module 116 can then calculate whether (1) plus (2) minus (3) is less than the storage system's physical storage capacity. If so, admission control module 116 can add the write request to write queue 112 for processing by deduplicator 114 (note that this flow requires some modifications to the operation of deduplicator 114, which are discussed below).

On the other hand, if the calculated value is equal to or greater than the storage system's physical storage capacity, admission control module 116 can reject the write request (i.e., decline placing it in write queue 112). This can effectively avoid situations where data in a thick storage object cannot be overwritten. For instance, returning to scenario 300 of FIG. 3, the foregoing approach will prevent any writes to be made to thin objects O1 or O2 (i.e., prevent the occurrence of steps (3) or (4)) once thick object O3 has been filled with 5 units of unique data (which is equal to the physical storage capacity of the system). This will avoid the problem described above where data in object O3 cannot be subsequently overwritten with new data due to existing pointers to the old data in O1 and/or O2.

It should be appreciated that system environment 100 of FIG. 1 is illustrative and various modifications are possible. For instance, although storage clients 104(1)-(N) are shown as being separate from storage system 102, in certain embodiments the storage clients and storage system can all be part of a single, integral system (e.g., VMs running on a host system with integrated host-side storage). In this particular embodiment, admission control module 116 can be implemented in a hypervisor layer of the host system. In addition, other configurations and arrangements of the entities shown in FIG. 1 are possible. One of ordinary skill in the art will recognize many variations, modifications, and alternatives.

Figure 4:
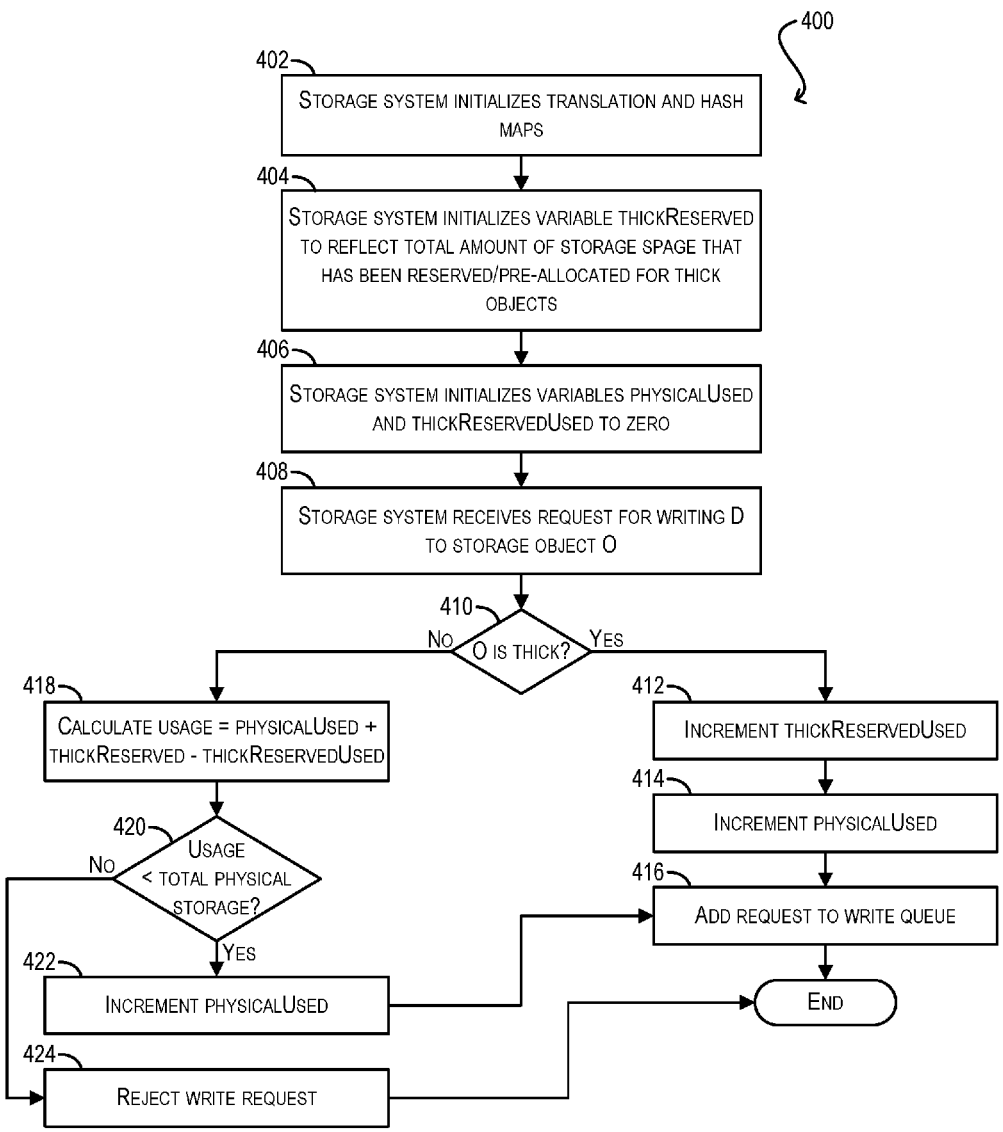
FIG. 4 depicts a flowchart for carrying out admission control of write requests according to an embodiment.

FIG. 4 depicts a flowchart 400 that provides further details on how storage system 102 and its admission control module 116 can enable data deduplication to work correctly with both thick and thin provisioning of storage objects according to an embodiment. Flowchart 400 assumes that one or more thick and/or thin storage objects have been provisioned in the storage system (i.e., space for the storage objects have been reserved) but no write requests have yet been received/processed.

At block 402 of flowchart 400, storage system 102 can initialize translation map 108 and hash map 110 (these maps will be initialized as empty data structures since no writes have occurred).

At block 404, storage system 102 can initialize a variable "thickReserved" to reflect the total amount of storage space that has been reserved/pre-allocated for thick storage objects in the system.

At block 406, storage system 102 can initialize variables "physicalUsed" and "thickReservedUsed" to zero. Variable physicalUsed can correspond to the total amount of physical storage space currently filled with data, while thickReservedUsed can correspond to the total amount of reserved storage space for thick storage objects that contains unique data (i.e., data that is referenced by only a single thick object).

At block 408, storage system 102 can receive (from, e.g., a storage client 104) a request for writing a data unit D to a storage object O in the system. In response, the write request can be forwarded to admission control module 116 and module 116 can check whether object O is a thick storage object (block 410). If so, admission control module 116 can increment the value of thickReservedUsed (block 412), increment the value of physicalUsed (block 414), and add the write request to write queue 112 (block 416). The addition of the write request to write queue 112 will cause the write request to the processed by deduplicator 114 at an appropriate time for either writing D to a new physical offset in the system (in the case that D is new) or updating storage object O to point to an existing instance of D on physical storage. Flowchart 400 can then end.

However, if object O is not a thick storage object (i.e., O is thin), admission control module 116 can calculate the value of physicalUsed+thickReserved−thickReservedUsed (identified by variable name "usage") (block 418). Usage represents the amount of physical storage space that is available for processing the write request, taking into account the space that has already been reserved for thick objects and the space that has been filled with unique data for thick objects. For example, with respect to scenario 300 of FIG. 3, the value of usage (prior to the execution of step (3)) would be 5+5−5=5.

Then, at block 420, admission control module 116 can check whether usage is less than the total physical storage capacity of storage system 102. If yes, admission control module 116 can increment physicalUsed (block 422) and add the write request to write queue 112 (block 416). If no, admission control module 116 can reject the write request (i.e., decline to place it into write queue 112) (block 424). This can involve, e.g., sending an error message back to the originating storage client that indicates the write cannot be completed due to lack of physical storage space. Finally, after block 416 or 424, flowchart 400 can end.

Figure 5:
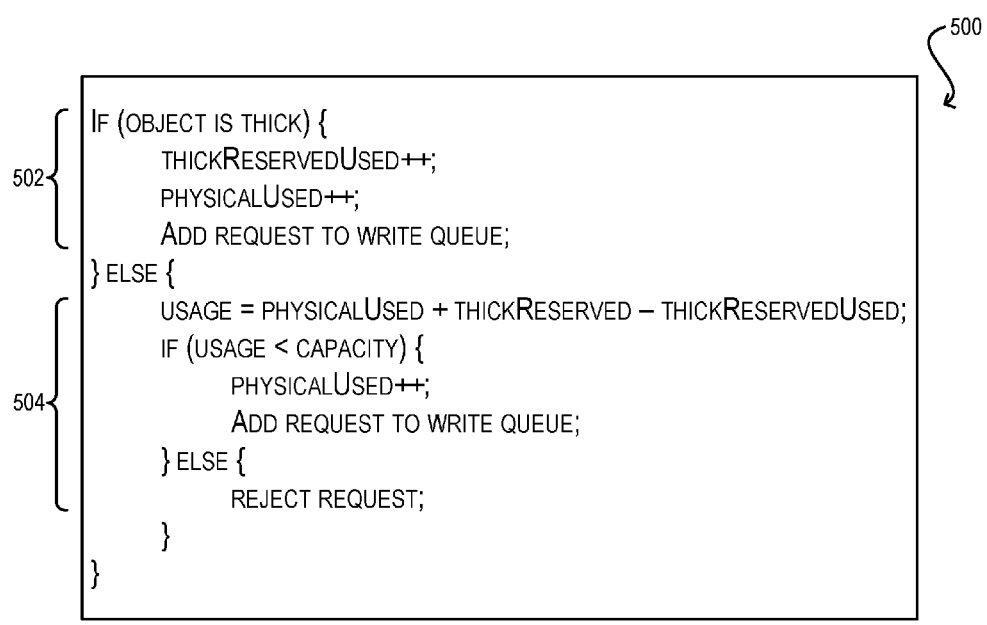
FIG. 5 depicts a pseudo code listing that implements the flowchart of FIG. 4 according to an embodiment.

FIG. 5 depicts a pseudo code listing 500 that corresponds to the processing attributed to admission control module 116 in flowchart 400 of FIG. 4. In listing 500, the section identified by reference numeral 502 corresponds to blocks 410-416 of flowchart 400, and the section identified by reference numeral 504 corresponds to blocks 418-424 of flowchart 400.

As mentioned previously, in some embodiments the implementation of admission control module 116 (as per FIGS. 4 and 5) can necessitate changes to the operation of deduplicator 114, specifically to ensure that variables physicalUsed and thickReservedUsed are appropriately decremented if data D already exists in storage. These changes are shown in FIG. 6, which depicts a modified version (600) of deduplicator pseudo code listing 200 of FIG. 2. In listing 600, these changes are shown at the section identified by reference numeral 602.

Figure 7:
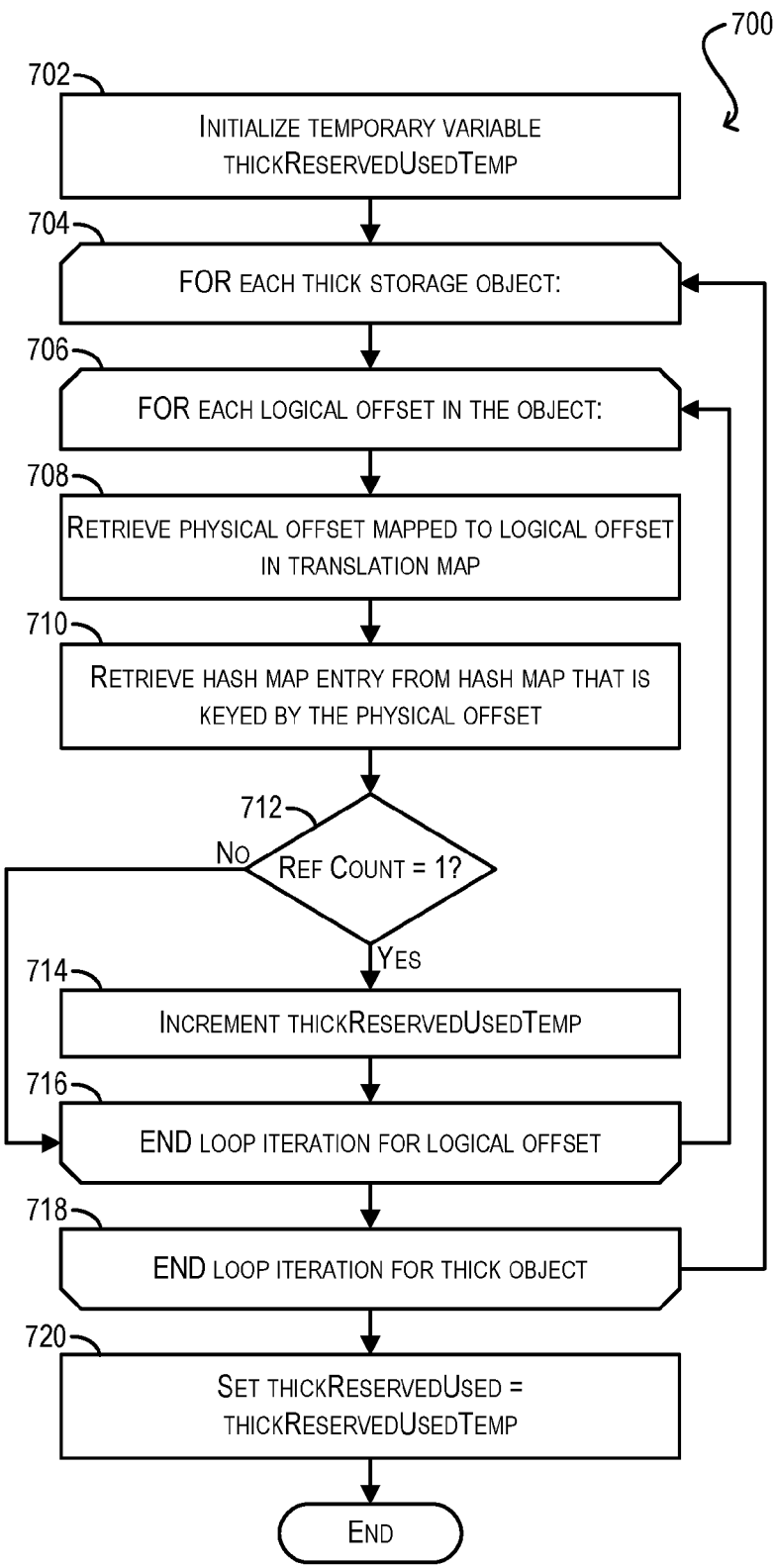
FIG. 7 depicts a flowchart for updating the variable thickReservedUsed (shown in FIG. 4) according to an embodiment.

It should be noted that the value of variable thickReservedUsed (i.e., the amount of reserved storage space for thick storage objects that contain unique data) can dynamically change during the runtime of the storage system due to writes to the thick objects as well as writes to any other thin or thick objects that refer to the same (i.e., deduplicated) data in the thick objects. To keep track of the most current value of thickReservedUsed, in a particular embodiment admission control module 116 (or some other component of storage system 120) can periodically scan the logical address spaces of the thick storage objects in the system and thereby determine how much of their content is unique. Admission control module 116 can then update the value of thickReservedUsed based on this information. An example of this scanning process is shown in FIG. 7 as flowchart 700 according to an embodiment.

Starting with block 702, admission control module 116 can initialize a temporary variable referred to as "thickReservedUsedTemp" to zero. Then, at block 704, admission control module 116 can enter a first loop for each thick storage object in the system, and at block 706 module 116 can enter a second loop for each logical offset of the thick storage object in translation map 108.

Within the first and second loops, admission control module 116 can retrieve the physical offset mapped to the logical offset in translation map 108 (block 708). Upon retrieving the physical offset, admission control module 116 can retrieve the hash map entry in hash map 110 keyed by this physical offset (block 710) and can check the hash map entry's reference count (block 712).

If the reference count is equal to one, admission control module 116 can increment thickReservedUsedTemp (block 714). Module 116 can then repeat the second loop as many times as necessary to process all logical offsets of the current thick storage object (block 716), and repeat the first loop as many times as necessary to process all thick storage objects (block 718).

Finally, at block 720, admission control module 116 can update the variable thickReservedUsed to equal the value of thickReservedUsedTemp and flowchart 700 can end. As noted above, flowchart 700 can be repeated on a continuous, periodic basis (via, e.g., a background process) in order to ensure that thickReservedUsed is always up-to-date.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for supporting data deduplication with thick and thin provisioning of storage objects, the method comprising:
   receiving, by a system, a write request directed to a storage object stored by the system;
   determining, by the system, whether the storage object is a thin storage object or a thick storage object; and
   if the storage object is a thin storage object:
      calculating, by the system, a usage value by adding a first value corresponding to a total amount of physical storage space used in the system to a second value corresponding to a total amount of storage space reserved for thick storage objects in the system and further subtracting a third value corresponding to a total amount of reserved storage space for the thick storage objects that are filled with unique data;
      determining, by the system, whether the usage value is less than a total storage capacity of the system; and
      if the usage value is not less than the total storage capacity, rejecting the write request.

2. The method of claim 1 further comprising:
   if the usage value is less than the total storage capacity:
      incrementing the first value; and
      adding the write request to a queue to be processed by a data deduplicator component of the system.

3. The method of claim 2 further comprising:
   if the storage object is a thick storage object:
      incrementing the first value;
      incrementing the third value; and
      adding the write request to the queue.

4. The method of claim 3 wherein the data deduplicator component is configured to decrement the first value if a deduplicated copy of the data associated with the write request is already stored by the system.

5. The method of claim 3 wherein the data deduplicator component is configured to decrement the third value if the storage object is a thick storage object.

6. The method of claim 1 further comprising:
   updating the third value on a periodic basis by scanning all thick storage objects in the system.

7. The method of claim 6 wherein scanning all thick storage objects in the system comprises:
   determining, for each logical offset of each thick storage object, whether a physical storage offset corresponding to the logical offset is referenced a single time.

8. A non-transitory computer readable storage medium having stored thereon software executable by a system, the software embodying a method for supporting data deduplication with thick and thin provisioning of storage objects, the method comprising:
   receiving a write request directed to a storage object stored by the system;
   determining whether the storage object is a thin storage object or a thick storage object; and
   if the storage object is a thin storage object:
      calculating a usage value by adding a first value corresponding to a total amount of physical storage space used in the system to a second value corresponding to a total amount of storage space reserved for thick storage objects in the system and further subtracting a third value corresponding to a total amount of reserved storage space for the thick storage objects that are filled with unique data;
      determining whether the usage value is less than a total storage capacity of the system; and
      if the usage value is not less than the total storage capacity, rejecting the write request.

9. The non-transitory computer readable storage medium of claim 8 wherein the method further comprises:
   if the usage value is less than the total storage capacity:
      incrementing the first value; and
      adding the write request to a queue to be processed by a data deduplicator component of the system.

10. The non-transitory computer readable storage medium of claim 9 wherein the method further comprises:
if the storage object is a thick storage object:
incrementing the first value;
incrementing the third value; and
adding the write request to the queue.

11. The non-transitory computer readable storage medium of claim 10 wherein the data deduplicator component is configured to decrement the first value if a deduplicated copy of the data associated with the write request is already stored by the system.

12. The non-transitory computer readable storage medium of claim 10 wherein the data deduplicator component is configured to decrement the third value if the storage object is a thick storage object.

13. The non-transitory computer readable storage medium of claim 8 wherein the method further comprises:
updating the third value on a periodic basis by scanning all thick storage objects in the system.

14. The non-transitory computer readable storage medium of claim 13 wherein scanning all thick storage objects in the system comprises:
determining, for each logical offset of each thick storage object, whether a physical storage offset corresponding to the logical offset is referenced a single time.

15. A system comprising:
a processor;
one or more physical storage devices; and
a non-transitory memory having stored thereon program code that causes the processor to, upon being executed:
receive a write request directed to a storage object stored by the one or more physical storage devices;
determine whether the storage object is a thin storage object or a thick storage object; and
if the storage object is a thin storage object:
calculate a usage value by adding a first value corresponding to a total amount of physical storage space used on the one or more physical storage devices to a second value corresponding to a total amount of storage space reserved for thick storage objects and further subtracting a third value corresponding to a total amount of reserved storage space for the thick storage objects that are filled with unique data;
determine whether the usage value is less than a total storage capacity of the one or more physical storage devices; and
if the usage value is not less than the total storage capacity, reject the write request.

16. The system of claim 15 wherein, if the usage value is less than the total storage capacity:
the first value is incremented; and
the write request is added to a queue to be processed by a data deduplicator component of the system.

17. The system of claim 16 wherein, if the storage object is a thick storage object:
the first value is incremented;
the third value is incremented; and
the write request is added to the queue.

18. The system of claim 17 wherein the data deduplicator component is configured to decrement the first value if a deduplicated copy of the data associated with the write request is already stored by the one or more physical storage devices.

19. The system of claim 17 wherein the data deduplicator component is configured to decrement the third value if the storage object is a thick storage object.

20. The system of claim 15 wherein the third value is updated on a periodic basis by scanning all thick storage objects in the system.

21. The system of claim 20 wherein scanning all thick storage objects in the system comprises:
determining, for each logical offset of each thick storage object, whether a physical storage offset corresponding to the logical offset is referenced a single time.

* * * * *